United States Patent [19]

Atkins et al.

[11] Patent Number: 5,424,101
[45] Date of Patent: Jun. 13, 1995

[54] METHOD OF MAKING METALLIZED EPOXY TOOLS

[75] Inventors: Richard P. Atkins, Utica; Hong-Hsiang Kuo; Chen-Shih Wang, both of Troy, all of Mich.

[73] Assignee: General Motors Corporation, Detroit, Mich.

[21] Appl. No.: 327,774

[22] Filed: Oct. 24, 1994

[51] Int. Cl.⁶ ............................................. B05D 1/02
[52] U.S. Cl. .................... 427/448; 427/197; 427/203; 427/205; 427/262; 427/267; 427/280; 427/404; 427/407.1; 427/419.5; 427/419.7; 427/422; 427/427; 427/449; 427/455; 427/456; 427/580
[58] Field of Search ............... 427/448, 197, 203, 205, 427/262, 267, 280, 404, 407.1, 419.5, 422, 427, 449, 455, 456, 580, 419.7

*Primary Examiner*—Bernard Pianalto
*Attorney, Agent, or Firm*—Lawrence B. Plant

[57] ABSTRACT

A metallized epoxy die formed by depositing boron nitride and iron oxide particle layers on the pattern used to form the die and spraying molten metal onto the particle layers followed by casting the epoxy against the exposed surface of the sprayed metal.

11 Claims, No Drawings

METHOD OF MAKING METALLIZED EPOXY TOOLS

This invention relates to epoxy tooling and more particularly to epoxy tools having a metallized working surface for improved durability and prolonged useful life.

BACKGROUND OF THE INVENTION

Conforming dies for the repetitive stamping of large numbers of identical sheet metal parts (e.g., automobile body parts) are typically made of high strength tool steel because of its rigidity and durability. Such dies are expensive and require appreciable manufacturing time because a large casting must first be made, and then complex forming surfaces accurately machined therein.

Automobile manufacturers have made stamping tools for making prototype srampings from lower strength zinc alloys such as Kirksite, or from mass castable polymeric tools. One family of materials commonly used in such polymeric tools is epoxy resins that can be cast to size into high strength tools. For example, Dearlove et al. U.S. Pat. No. 4,423,094 discloses a tough durable bisphenol A epoxy composition for making sheet metal stamping dies. Moreover, Wang et al. U.S. Pat. No. 4,920,161 discloses a room-temperature-cured cast-to-size epoxy tooling material having high loadings of specific particle sizes of inert fillers (e.g., silicon carbide and silica) have high tensile strengths. Others have proposed room temperature curable epoxy resins systems such as those based on bisphenol A and aromatic amine catalysts. Still further, Dearlove et al. U.S. Pat. No. 5,280,053 discloses a readily machinable, highly filled (i.e., with iron powder and glass fibers) tooling epoxy. Tools made from such materials have a limited useful life typically less than 5000 parts.

In the making of such polymeric tools a pattern or "casting aid" is machined or otherwise constructed to the desired configuration of the sheet metal part to be made, and the epoxy then cast against the pattern to form the desired shape in the epoxy. Patterns for this purpose typically comprise natural wood, epoxy, urethane, plaster, clay, sheet wax, steel and aluminum.

It would be economically attractive to make polymeric dies that are more durable so that they could be used for low volume production runs rather than just for a few prototype parts. It has heretofore been proposed to increase the durability and useful life of the forming surface of polymeric dies by metallizing such surface with low melting point metals such as zinc. To this end, the pattern is (1) first coated with a high temperature black spray paint such as consumers commonly use to paint outdoor cooking grills (e.g., a methyl phenyl silicone-polyester based paint such as TAFA 4140 Black Paint), (2) a coating of PVA is applied over the black paint, (3) zinc is then arc-sprayed atop the PVA, and finally (4) an appropriate epoxy is cast against the zinc so as to adhere thereto and serve as a backup for the zinc. The arc-spray technique yields a rough exterior surface comprising a plethora of peaks and valleys to which the epoxy readily adheres.

Unfortunately, low melting point (i.e., <ca. 400° C.) metals like zinc are likewise relatively soft, and accordingly do not provide the durability and extended useful life that harder metals would. Harder metals, however, typically have a much higher melting point, and attempts to arc-spray such harder metals onto the patterns prepared in the same manner as they are to receive zinc has resulted not only in a degradation of the pattern's surface, but a high incidence of droplets of the metal actually bouncing off of the pattern surface rather than adhering thereto both resulting from the molten metal burning through the paint and PVA coatings. The net effect is that attempts to arc-spray higher temperature metals such as silicon bronze (MP 1000° C.), steel (MP 1500° C.), molybdenum (MP 2600° C.), copper (MP 1083° C.), nickel (MP 1455° C.) and aluminum (MP 660° C.) onto the pattern have heretofore been ineffective to produce quality epoxy tools.

Accordingly, it is an object of the present invention to provide a process for producing a metallized epoxy tool including a unique pretreatment for the tool-making pattern which permits metallization thereof with harder, higher melting point metals than zinc.

This and other objects and advantages of the present invention will become more readily apparent from the detailed description thereof which follows.

BRIEF DESCRIPTION OF THE INVENTION

The present invention contemplates a method of making a castable epoxy die having an arc-sprayed, metallized working surface by a process wherein the pattern is coated with a shield prior to depositing the metal. The shield not only protects the surface from degradation, but reduces the incidence of metal droplets bouncing off of the pattern during spraying. The shield/coating comprises a first layer of boron nitride particles deposited onto the working surface of the pattern, and a second layer of iron oxide particles (i.e., iron ore—$Fe_3O_4$) subsequently deposited atop the boron nitride particle layer. The boron nitride particles and iron oxide particles are sequentially applied as liquid suspensions which, upon drying, leave the particles adhering to the surface. While water alone can be used, the suspension vehicle will preferably contain a suitable polymeric binder (preferably polyvinyl alcohol—hereinafter PVA) which holds the particles together on the surface of the pattern. In this regard, both the boron nitride particles and the iron oxide particles are preferably admixed with an aqueous solution of the PVA and then sprayed (preferable), brushed or otherwise deposited onto the surface. Prior to depositing the iron oxide coating, the boron nitride coating is dried to remove the liquid carrier leaving the boron nitride particles trapped in the PVA. The iron oxide coating is then applied and dried in a similar manner. The boron nitride particle layer will preferably have a thickness between about 0.005 mm and about 0.015 mm. The iron oxide particle layer will preferably have a thickness of at least about 0.01 mm but not so thick as to affect the dimensional accuracy of the pattern. The composition of the aqueous PVA-boron nitride suspension can vary from about 20% by weight to about 60% by weight boron nitride, but will preferably comprise about 40% to about 50% by weight boron nitride as a good compromise between sprayability (i.e., viscosity between about 80 to about 120 centipoise) and effectiveness in terms of accepting the sprayed metal. The dried boron nitride coating contains about 40% to about 80% by weight boron nitride and the balance PVA. Boron nitride particle sizes ranging from about 1 to about 15 microns have been used effectively, and larger sizes are also expected to be useful. The iron oxide particles can be deposited (sprayed) from aqueous PVA suspension thereof wherein the iron oxide comprises about 30% by weight to about 60% by weight of the suspension (viscosity of about 800 centipoise). The finer the iron oxide powder the smoother the metal surface and the working face of the die will be. Iron oxide particles having a particle size less than 12 microns have been used effectively. The dried iron oxide coating contains about 80% to about 95% by weight iron oxide and the balance PVA.

After the iron oxide layer has dried, the pattern surface is arc-sprayed with the desired metal. In the arc-spraying process, an electric arc is struck between two wires formed of the metal to be sprayed, and a stream of high pressure air, or preferably inert gas (e.g., Ar, $N_2$, etc.), directed into the arc to propel the molten droplets formed therein against the pattern surface. The molten droplets are propelled at high velocity and impinge and flatten against the pattern so as to adhere to the pattern and fuse to each other as they build up into a continuous coating. The surface of the metal coating contiguous the iron oxide particles will take on a surface finish determined by the size of the iron oxide particles and accordingly such particles should be as fine as possible. In contrast thereto, the exterior surface (i.e., confronting the nozzle of the arc-spraying device) of the metal layer will preferably have a very rough surface characterized by a plethora of peaks and valleys which serve to anchor the metal layer to the epoxy subsequently cast thereagainst. The roughness achieved will vary with the spraying parameters used, but will generally have a total peak-to-valley roughness $R_t$ of about 50 microinches and an arithematic average roughness Ra of about 1.5 to about 3.0 micrometers. Following the coating and cooling of the metal, a suitable tooling grade epoxy resin is cast against the rough exterior surface of the metal so as to fill the valleys and embed the peaks therein. The epoxy is then cured so as to harden and anchor it to the exterior surface of the metal coating. Finally, the pattern is separated from the metal layer so as to expose the smooth inner surface of the metal layer that had contacted the iron oxide layer during the arc-spraying process. Dusting, light brushing or washing of the metal surface is sufficient to remove any boron nitride/iron oxide particles adhering thereto.

The present invention is useful with a variety of pattern materials such as described above. As the properties of each of the pattern materials varies significantly from one material to the next, the parameters used to deposit the boron nitride, iron oxide and metal layers onto these materials also varies somewhat. However, we have found it to be particularly advantageous to precoat the various pattern materials, of whatever kind they might be, with a paint which so conditions the surfaces of the different pattern materials that a single optimized set of boron nitride, iron oxide and metal deposition parameters can be used for all of these materials. So conditioning or painting of the several pattern materials, effectively masks their individual properties, and presents a consistent surface which permits a set of universal deposition parameters to be used regardless of the composition of the pattern thereby eliminating the need to have a different set of deposition parameters particularly tailored to each different pattern material.

DETAILED DESCRIPTION OF THE INVENTION

A pattern, or casting aid, of a suitable material is machined or otherwise constructed to provide the desired working surface configuration on the die to be made therefrom. A preferred such material is a laminated epoxy fiberglass having a surface finish of about 220 grit. Other well-known pattern materials such as mentioned above, however, may also be used. In order to avoid the need for having to have different process parameters for each of the different pattern materials, a conditioning coating is used for all of the different pattern materials to render them all receptive to the receipt of the subsequently applied shielding and metal layers using a common, or universal, set of deposition parameters. An acrylic, lacquer-type paint primer containing talc and titanium dioxide pigments in a rosin ester/acrylic polymer binder has been found to be useful for this conditioning coating. A preferred such conditioning coating is identified by its supplier, The Sherwin Williams Co., as Super Combo Primer-Surfacer, Gray No. P2A-32. A thickness of about 0.03 millimeters of the P2A-32 material has been found to be effective to mask the individual properties of the underlying patterns, and permit use of the universal processing parameters. We have also found that a very thin coating of PVA applied atop the conditioning coating acts as a parting agent to assist in the release of the sprayed metal from the pattern. While the use of conditioning and/or PVA parting agent layers are desirable, they are not believed to be necessary to the practice of the present invention.

In accordance with the present invention, a layer of boron nitride particles is deposited onto the surface of the pattern used to shape the working surface of the epoxy die. The boron nitride particles are suspended in a suitable vehicle having a binder (e.g., PVA) for the boron nitride particles dispersed therein, and applied (preferably sprayed) to the surface. We have successfully used an organic solvent-based Boron Nitride Aerosol Spray provided by the Advanced Ceramics Corp., but prefer aqueous coating materials. In this regard, we have found that the solvents used in the solvent-based spray are sometimes incompatible with chemicals used to treat the surface of the pattern. In one instance, for example, the surface of the pattern had been sealed with lacquer and the solvent in the boron nitride vehicle produced hairline cracks in the lacquer which became duplicated in the hard metal coating. While conceivably such problems could be obviated by using different organic solvents for the boron nitride suspension, it is more simply obviated by avoiding the use of organic solvents all together. Accordingly, we prefer to use an aqueous boron nitride suspension. One readily sprayable such aqueous material is available commercially from the Advanced Ceramics Corporation under the designation Boron Nitride Water Based Paint Grade HPC. This material contains 10%–30% by weight boron nitride particles, 10%–30% titanium dioxide particles, and less than 4% by weight modified bentonite clay in a water-based emulsion. The emulsion, as purchased, is thinned with PVA dissolved in water to a 50–50 by weight mixture (i.e., 50% emulsion and 50% PVA solution) and then sprayed with a Binks Model 62 air atomizing spray gun onto the target surface of the pattern to a thickness of about 0.005 mm to about 0.015 mm. More specifically, the PVA-boron nitride mixture is prepared by (1) mixing the ingredients in an intensive shear mixer, and (2) filtering the homogenized mixture through a regular paint filter. The boron nitride concentration in the mixture can be varied from about 20% to about 60% by weight. A composition of about 40% to about 50% by weight is considered to be optimal in that it not only serves to protect the surface of the pattern, but is a readily sprayable liquid having a viscosity in the range of about 80 to about 120 centipoise. While mixtures containing less than 20% boron nitride concentrations can be mixed and sprayed more easily, such mixtures are less effective in accepting the metal deposition. Similar results have been obtained using Boron Nitride Water Based Paint Grade GPC (also from Advanced Ceramics Corp.). This boron nitride paint contains at least about 30% by weight boron nitride, less than 4% by weight modified bentonite clay and water. Tests have shown that the HPC Grade boron nitride produces a smoother interface, and consequently a smoother metal coating, than the GPC Grade presumably because of the boron nitride particle sizes involved. In this regard, the HPC Grade material has a bimodal particle size distribution wherein the particles are distributed in two narrow ranges, i.e., 1–3 micron and 12–15 micron. The GPC Grade, on the other hand, has a broad particle size distribution, and a mean particle size of 7 microns. The PVA-boron nitride compositions spray best if they are kept slightly acidic (i.e., pH less than 6.5).

The iron oxide particles are deposited from a suspension thereof containing about 30% to about 60% by weight iron oxide particles in an aqueous solution of PVA, and are likewise preferably deposited by spraying. Smooth metal surfaces on the face of the die are achieved by using a very fine iron oxide powder. A particularly effective such powder is a ground ore (i.e., Magnetite) supplied by the Pea Ridge Iron Ore Co. under the product number M-25 (1.4 RPS). M-25 iron oxide has a mean particle size of 1.4 microns and a particle size distribution of 0.4 to 12 microns. It contains about 72% by weight Fe and minor amounts of $SiO_2$, CaO, MgO, $Al_2O_3$, $TiO_2$, $K_2O$, $Na_2O$, S, Mn, Cu, Cr, Ni, Mo, and P. The suspension has a viscosity of about 800 centipoise and is deposited to a thickness of at least about 0.01 mm.

Aqueous PVA solutions have proven to be quite effective as vehicles for the boron nitride and iron oxide powders, with the PVA serving as a binder to retain the particles on the pattern and promote easy separation of the sprayed-on metal from the pattern. A PVA material identified as RP-804 by its manufacturer, Ren Plastics Co., has proven to be very effective. RP-804 PVA consists of approximately 10% by weight PVA, 20% by weight 2-propanol and 70% water. Another similar solution supplied by the Freeman Manufacturing and Supply Co. has also proved useful.

Arc-spray metallization of a variety of substrates is a well known process and involves striking an electric arc between two feed wires of the desired metal to be deposited and propelling the molten metal produced against the target by a high velocity gas stream. A variety of manufacturers provide equipment for this purpose. We have had success using a Model BP-400 system provided by the Miller Thermal Inc., and a Model 9000 systems provided by the Hobart Tafa Technologies Inc. to spray alloys of iron, copper, molybdenum, aluminum, nickel and zinc onto patterns used to make metal faced epoxy tools. The spraying parameters varied with the particular metal being used and the final properties sought to be achieved (e.g., degree of roughness). Generally, however, (1) voltages will fall within the range of about 18 volts to about 36 volts (i.e., between the metal wires fed into the spray gun), (2) currents between about 50 amperes to about 300 amperes, (3) atomization gas pressures between about 40 psi to about 100 psi, (4) distances of about 100 to about 500 mm between the spray gun and the pattern, and (5) spray gun traversing speeds between about 300 to about 1200 mm per second.

The nature of the metal coating will vary with the spraying parameters used. Based on certain tests with zinc, some generalizations can be made for all metals. The distance between the spray gun and the pattern appears to have the greatest influence on the thickness and microstructure of the coating. Large gun-to-pattern distances tend to produce thinner coatings that have a poorly knit structure characterized by large internal voids or porosity. Shorter distances tend to produce a more refined structure with smaller internal porosity and higher cohesive strengths. It is reasonable to conclude therefore that the better properties obtained from the short gun-to-target distances are the result of (1) faster and hotter droplets causing harder impact, better flattening and coalescence of the droplets upon impact, and (2) less oxidation of the droplets and better coalescence of the droplets upon impact. The atomizing gas pressure appears to exert the strongest influence on surface structure (i.e., roughness). Low atomizing gas pressures tend to produce surfaces with large surface pores and roughness, while high such pressures tend to produce a more refined surface with smaller porosity and lower roughness. The more refined/smoother surface is seen to result from the faster droplets that result from higher gas pressures, and possibly the production of smaller droplets when higher gas pressures are used. Wire feed rates (i.e., into the spray gun) most dramatically affect the thickness of the metal coatings at constant gun traversing rates. Higher feed rates produce thicker metal coatings and contribute to a finer, less porous microstructure. Perhaps this is due to the larger metal droplets being formed at higher wire feed rates which result in less heat dissipation and higher temperatures in the impact zone. Finally, spray gun traversing speed has its greatest influence on coating thickness. Slower traversing speeds result in thicker coatings and tend to result in a finer, less porous microstructure.

While the invention was developed primarily for the purpose of depositing high melting point, hard metals onto the surface of the pattern, it is of course also useful with lower melting point metals such as zinc. The boron nitride/iron oxide layers not only serve to protect the pattern surface during metal spraying and promote ready separating of the metal layer from the pattern, but they also (1) reduce the incidence of the metal droplets bouncing off of the pattern, and (2) promote adherence of the droplets to the pattern and build up thereof to form a continuous metal layer.

EXAMPLE

To verify the effectiveness of the invention, an epoxy die having an arc-sprayed steel facing thereon, was made according to the process described above. A laminated epoxy-fiberglass pattern having a 220 grit surface was conditioned by spraying it with (1) a 0.03 mm thick layer of Super Combo Primer-Surfacer Gray No. P2A-32, (2) a 0.015 mm thick layer of Grade HPC boron nitride-PVA, and (3) a 0.01 mm thick layer of M-25 (1.4 RPS) iron oxide in PVA. A steel facing was arc-sprayed to a thickness of 0.75 mm from commercial grade steel wire containing iron, carbon, manganese, etc. An epoxy comprising bisphenol A resin polyoxypropylene amine curing agent, and iron powder was cast against the exposed surface of the arc-sprayed steel and allowed to cure before removing the steel from the pattern. The die so made was substituted for a regular production steel die used to stamp door modules for an automobile. The door module comprised a galvanized mild steel and was 1 mm thick. The metal-faced epoxy tool was used repeatedly, and produced 70,000 qualified such modules with very minimum die wear observed.

Metallized epoxy tools according to the present invention can be used for many processes other than stamping, such as injection or compression molding molds, hydroforming dies, etc.

While the invention has been disclosed primarily in terms of certain embodiments thereof it is not intended to be limited thereto but rather only to the extent set forth hereafter in the claims which follow.

The embodiments of the invention in which an exclusive property or privilege is claimed are defined as follows:

1. A method of making an epoxy die having a metallic working surface comprising the steps of:
   providing a pattern having a smooth pattern surface conforming to the shape of said working surface;
   depositing a first layer of boron nitride particles atop said pattern surface;
   depositing a second layer of iron oxide particles atop said boron nitride particle layer;
   propelling a plethora of molten metal droplets onto said iron oxide layer so as to form a continuous layer of said metal thereon, said metal having a rough exterior surface characterized by a plethora of micro-peaks and valleys distributed across said exterior surface;
   casting a mass of tool grade epoxy resin against said rough exterior surface so as to fill said valleys and embed said peaks;
   curing said epoxy so as to harden and anchor it to said exterior surface; and
   separating said pattern from said metal layer so as to expose said metal layer as the working surface of said die.

2. A method according to claim 1 wherein said metal is arc-sprayed onto said pattern surface.

3. A method according to claim 1 wherein said boron nitride particles are dispersed throughout a polymeric binder and comprise about 40% to about 80% by weight of said first layer.

4. A method according to claim 3 wherein said binder is polyvinyl alcohol.

5. A method according to claim 4 wherein said boron nitride particles range in size from about 1 micron to about 15 microns.

6. A method according to claim 1 wherein said iron oxide particles are dispersed throughout a polymeric binder and comprise about 80% to about 95% by weight of said second layer.

7. A method according to claim 6 wherein said binder is polyvinyl alcohol.

8. A method according to claim 7 wherein said iron oxide particles range in size from about 0.4 to about 12 microns.

9. A method according to claim 1 wherein said first and second layers are each deposited from a suspension of said particles in an aqueous solution of said binder.

10. A method according to claim 1 wherein said metal is selected from the group consisting of iron, copper, molybdenum, aluminum, nickel, zinc and alloys thereof.

11. A method according to claim 1 wherein said pattern surface is conditioned by applying a coating of paint containing talc and titanium dioxide pigments to said surface prior to depositing said boron nitride particles.

* * * * *